(12) United States Patent
Baumgartner

(10) Patent No.: US 11,785,692 B2
(45) Date of Patent: Oct. 10, 2023

(54) SUPPLEMENTAL EXTERIOR LIGHTING SYSTEM FOR RECREATIONAL VEHICLES

(71) Applicant: Jayco, Inc., Middlebury, IN (US)

(72) Inventor: Greg Baumgartner, Milford, IN (US)

( * ) Notice: Subject to any disclaimer, the term of this patent is extended or adjusted under 35 U.S.C. 154(b) by 0 days.

(21) Appl. No.: 17/300,927

(22) Filed: Dec. 16, 2021

(65) Prior Publication Data

US 2022/0117061 A1 Apr. 14, 2022

Related U.S. Application Data

(63) Continuation of application No. 15/932,862, filed on May 9, 2018, now Pat. No. 11,229,103.

(51) Int. Cl.
| | | |
|---|---|---|
| *B60Q 1/26* | (2006.01) | |
| *H05B 45/56* | (2020.01) | |
| *B60Q 1/30* | (2006.01) | |
| *B60D 1/64* | (2006.01) | |
| *B60Q 1/34* | (2006.01) | |
| *B60Q 1/44* | (2006.01) | |
| *B60Q 1/22* | (2006.01) | |
| *B60Q 1/32* | (2006.01) | |
| *H05B 45/10* | (2020.01) | |
| *B60P 3/32* | (2006.01) | |
| *H05B 47/16* | (2020.01) | |

(52) U.S. Cl.
CPC ............... *H05B 45/56* (2020.01); *B60D 1/64* (2013.01); *B60Q 1/22* (2013.01); *B60Q 1/2607* (2013.01); *B60Q 1/305* (2013.01); *B60Q 1/32* (2013.01); *B60Q 1/34* (2013.01); *B60Q 1/44* (2013.01); *H05B 45/10* (2020.01); *B60P 3/32* (2013.01); *H05B 47/16* (2020.01)

(58) Field of Classification Search
CPC .... B60P 3/32; B60D 1/64; B60Q 1/22; B60Q 1/32; B60Q 1/34; B60Q 1/44; B60Q 1/305; B60Q 1/2607; H05B 45/10; H05B 45/56; H05B 47/16
See application file for complete search history.

(56) References Cited

U.S. PATENT DOCUMENTS 5,729,058 A * 3/1998 Groeller .................. B60D 1/64
 315/77
5,775,712 A * 7/1998 Link ........................ B60Q 1/46
 340/471

(Continued)

*Primary Examiner* — Kurtis R Bahr
(74) *Attorney, Agent, or Firm* — Ryan M. Fountain

(57) ABSTRACT

Exterior lighting systems are provided for towed vehicles, such as towed RVs, which includes a control module for receiving conventional illumination signals from the towing vehicle through a conventional trailer plug, and supplementing those conventional illumination signals with synchronized supplemental LED lighting. That supplemental lighting can include "constant-on" flashing LEDs indicative of operator intentions in the towing vehicle, either at locations adjacent conventional exterior lighting or other locations on the trailer. The control module can also support supplemental exterior illumination of the RV when the towed vehicle is stationary and in use for camping or advertisement. The control module includes a failsafe mode in the event of a fault in the supplemental lighting (so as to maintain conventional exterior lighting capability), diagnostic LED output for troubleshooting, and an automatic reset feature.

12 Claims, 3 Drawing Sheets

(56) References Cited

U.S. PATENT DOCUMENTS

| | | | | |
|---|---|---|---|---|
| 6,121,551 | A * | 9/2000 | Dobrow | B60Q 1/32 |
| | | | | 174/113 R |
| 6,130,487 | A * | 10/2000 | Bertalan | H05B 47/20 |
| | | | | 340/12.32 |
| 6,535,113 | B1 * | 3/2003 | Gravolin | B60Q 11/007 |
| | | | | 340/687 |
| 7,746,219 | B1 * | 6/2010 | Paul | B60Q 1/305 |
| | | | | 340/431 |
| 8,932,065 | B2 * | 1/2015 | Gerling | B60D 1/64 |
| | | | | 439/35 |
| 10,710,560 | B2 * | 7/2020 | Prabhakar | B60T 17/22 |
| 2002/0125771 | A1 * | 9/2002 | Kaminski | B60D 1/62 |
| | | | | 307/10.1 |
| 2009/0007948 | A1 * | 1/2009 | Dempsey | B60P 3/341 |
| | | | | 135/96 |
| 2012/0280807 | A1 * | 11/2012 | Kulkarni | B60Q 1/305 |
| | | | | 340/475 |
| 2013/0063026 | A1 * | 3/2013 | Stickley | B60Q 1/2603 |
| | | | | 315/77 |
| 2014/0313756 | A1 * | 10/2014 | Thomson | B60Q 1/32 |
| | | | | 362/512 |
| 2016/0264220 | A1 * | 9/2016 | Laceky | B60P 3/1075 |

* cited by examiner

US 11,785,692 B2

SUPPLEMENTAL EXTERIOR LIGHTING SYSTEM FOR RECREATIONAL VEHICLES

This patent application is a continuation of U.S. patent application Ser. No. 15/932,862, filed on May 9, 2018.

BACKGROUND OF THE INVENTION

The present invention relates generally exterior lighting for towed vehicles, and more particularly, to towed recreational vehicles (RVs), such as travel trailers, fifth wheel trailers, toy haulers, and the like. The present invention has particular application to exterior lighting systems used for turn, braking, and backup indication of the intentions of the operator of the towing, as well as to supplemental illumination for decoration, advertisement, and safety.

In general, towed vehicles, including towed recreational vehicles, have exterior lighting on the rear and sides thereof which are synchronized with the exterior lighting of the towing vehicle (such as a fifth-wheel pick-up truck). This synchronization is typically provided through a conventional seven-way trailer cord between the towing and towed vehicles.

However, it has been found to be desirable to supplement the conventional exterior lighting on the towed vehicle for a variety of reasons, including increased visibility in conventional directions of view, increased range and directions of visibility, decoration, advertisement, and safety both during travel and during stationary use of the towed vehicle or trailer. For example, it has been found desirable to have a more complete directional range of indicator lighting for turning, braking, lane change, and back-up motions (including operator intentions of such motion), allowing other vehicles 360 degree visibility of the travel trailer over a greater range of elevations. However, illumination systems using prior technology for that purpose could need to be independently installed and operated, rather than fully integrated and synchronized with the conventional illumination systems (as a combination system), because of the risk of feedback interference with the tow vehicle controls (using a microprocessor therein, for example). Further, a fault occurrence in combination systems using prior technology could result in a complete system shut down, rendering the entire illumination system inoperative.

OBJECTIVES OF THE INVENTION

Accordingly, a primary objective of the present invention is to provide improved exterior lighting systems for RVs. These improvements include providing exterior lighting systems which:
  a. are inexpensive to manufacture and maintain,
  b. increase traffic safety during transportation of the RV,
  c. minimize component weight,
  d. facilitate RV advertising and safety during use, and
  e. increase the aesthetic appeal of the RV.

SUMMARY OF THE INVENTION

These and other objectives of the present invention are achieved by the provision of exterior lighting systems for towed vehicles, such as towed RVs, which includes a control module for receiving conventional illumination signals from the towing vehicle through a conventional trailer plug, and supplementing those conventional illumination signals with synchronized supplemental LED lighting. That supplemental lighting can include "constant-on" flashing LEDs indicative of operator intentions in the towing vehicle, either at locations adjacent conventional exterior lighting or other locations on the trailer. The control module can also support supplemental exterior illumination of the RV when the towed vehicle is stationary and in use for camping or advertisement. The control module includes a failsafe mode in the event of a fault in the supplemental lighting (so as to maintain conventional exterior lighting capability), diagnostic LED output for troubleshooting, and an automatic reset feature.

Other objects, advantages, and novel features of the present invention will become readily apparent from the following drawings and detailed description of certain preferred and alternative embodiments.

DETAILED DESCRIPTION OF PREFERRED EMBODIMENTS

Figure 1:
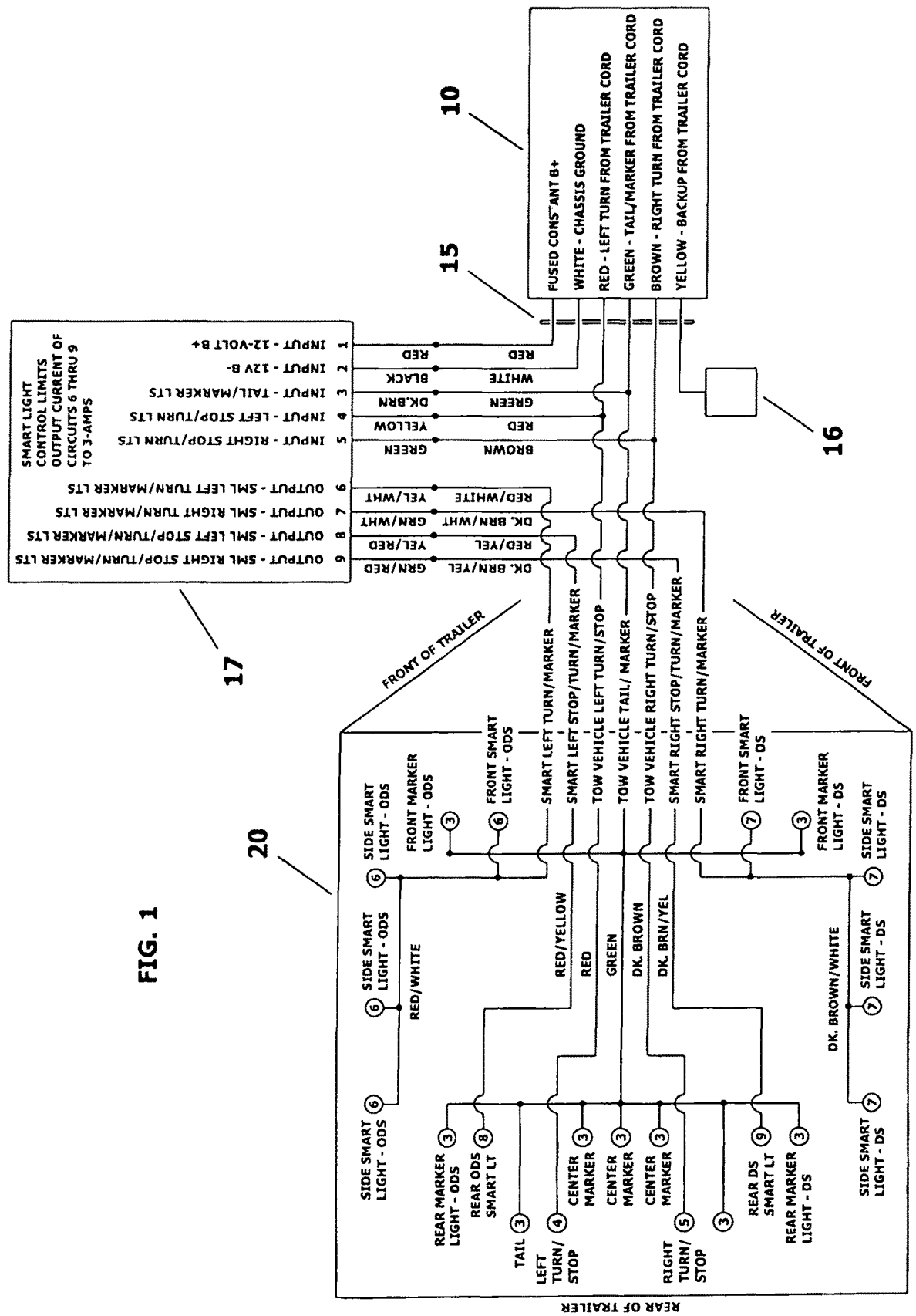
FIG. 1 shows a partial schematic view of circuitry for an exterior lighting system, according to the teachings of the present invention, as mounted with respect to a towing vehicle and a towed vehicle.

The following features are illustrated in the drawings:
  a towing vehicle 10, such as a pick-up truck or fifth-wheel type hitch of pick-up truck,
  a towed vehicle 20, such as a travel trailer (or fifth-wheel travel trailer or toy hauler type travel trailer) having a front end adjacent the towing vehicle, and a rear end longitudinally opposite the front end,
  a conventional trailer plug 15, joining the conventional, exterior indicator lighting system of the towing vehicle to the exterior lighting system of the towed vehicle,
  back-up lights 16, and
  a control module 17, connected to the trailer plug for controlling the supplemental exterior illumination of the towed vehicle.

Preferably, control module 17 is mounted within the towed vehicle, although in alternative embodiments it can be mounted within the towing vehicle. Control module 17 is a conventional, commercially available programmable device, such as KIB part number FLM1199B-TS or American Technology Components, Inc., part number AT-STI-001.

The fused constant "B+" or battery source, such as a positive 12 volt battery supply with an in-line fuse, can be from a battery mounted in either or both vehicles, although a trailer battery source is often preferred. Similarly, the chassis ground can be to either or both vehicles in given embodiments, although a trailer chassis ground is often preferred.

As an overview, the present invention is a 12 volt direct current control system, used to monitor a towing vehicle's tail/marker lights, left stop/turn, and right stop/turn signals and then intelligently power single function (two wire) lights as marker/turn lights for the left and right sides, or marker/stop/turn lights as left and right rear lights for the towed vehicle. While the drawings show a battery power supply, a trailer's power converter, or the tow vehicle's charge line, or any combination thereof can be used, as desired in a given application. Typically, the control module will receive input signals from the towing vehicle's tail/marker light circuit, left turn/stop circuit, and right turn/stop circuit through a conventional 7-way trailer cord. The control module of the present invention provides operational power to the left side, right side, left rear, and right rear supplemental LED lights of the present invention, synchronized with the transmission of operation power to the conventional exterior indicator lights on the trailer.

Preferably, control module 17 is a "smart" trailer light control modules in a potted, two inch×three inch×one inch ABS plastic enclosure, with screw mounting provisions. The electronics of control module 17 use, for example, a micro-controller or CPU to control sequencing and switching logic and is constructed to have substantial protection circuitry with reliability suitable for use in RV environments. Automotive grade solid-state smart FETs, internally protected against reverse voltage, over voltage, under voltage, short circuit, over temperature, and over current conditions are, for example, used for each of the representative four smart light outputs (LS, RS, LS, RR, in the drawings).

Functionally, control module 17 controls, for example, four smart light outputs, either stead ON or flashing ON/OFF, based upon the conditions of the various signal inputs. However, in preferred embodiments, the flashing signals, such as through LEDs, do not actually turn off. Rather, the light is powered to a reduced brightness (such as between 10% and 100% of the LED brightness). Thus, the LEDs are operated as "constant-on."

More specifically, the tail/marker light signal is, for example, a +12 volt DC signal from the towing vehicle. When the tail/marker signal is present in all four of the smart light outputs, LS, LR, RS, and RR will turn on as marker lights. The control module is programed and structured such that if the battery input fuse is blown or if the internal micro-controller circuitry stops working, the control module will still pass the towing vehicle tail/marker signal through to all four smart light outputs.

Further, when the towing vehicle is braking, the control module will receive a +12 volt DC signal on both left stop/turn and right stop/turn inputs at the same time. When the stop signals are present, both the left rear and right rear smart light outputs will, for example, turn ON as stop lights. If the smart lights were already ON as marker lights when this happens, they are, for example, programmed to flash three times quickly and then return to a steady ON. If the tail/marker signal is turned ON while the smart lights were already ON as stop lights, they will, for example, remain ON with no flicker or flash of the lights. Similarly, the smart light outputs will remain steady ON, until both stop, and tail/marker signals turn OFF, or until a stop/turn signal begins flashing ON/OFF.

Also, in preferred embodiments, the left stop/turn flashing signal is a +12 volt DC signal from the towing vehicle, which rhythmically pulses ON/OFF. When the left stop/turn flashing signal is present, the smart light control module will, for example, provide a synchronized pulsing power signal to the left side and left rear smart light outputs. Both LS and LR smart light outputs will always pulse in sync with the left stop/turn flashing signal, regardless of whether the stop and/or tail/marker signals were already present or become present while a left stop/turn signal is flashing. If the stop and/or tail/marker signal is present when the left stop/turn flashing signals stop pulsing, both LS and LR smart light outputs will smoothly return to a steady ON state. The same arrangement (with corresponding right side and right rear smart light outputs, etc.) is typically provided with respect to the right stop/turn flashing signals.

In addition, at power-up, the control module will be in a low current, sleep mode (~0.5 mA, for example), and the present invention provides that the green LED will quickly flash ON/OFF one time every ten seconds to indicate that sleep mode. The module will "wake" and enter an active mode as soon as it detects marker lights, left turn/stop, and/or right turn/stop signal inputs. The green LED will then be ON continuously in active mode. The control module will return to a low current sleep mode ten minutes (or such other designated time) after it stops seeing inputs from the 7-way trailer plug or trailer cord. Further, the control module can, for example, be programmed for the green LED to indicate six or more different fault conditions, by flashing the LED ON/OFF from one to six times, pausing four seconds between repetitions. Preferably, all such fault condition indications will clear when the control module enters the low current sleep mode.

Exemplary fault condition indications are:
one flash—left rear smart light output over current/over temperature shutdown,
two flashes—left side smart light output over current/over temperature shutdown,
three flashes—right rear smart light output over current/over temperature shutdown,
four flashes—right side smart light output over current/over temperature shutdown,
five flashes—low battery input voltage condition detected,
six flashes—one side turn/stop input ON continuously without the other side turn/stop input present, most likely resulting from not receiving one of the turn/stop input signals, and
Continuous fast flashes—internal programming fault, reset power to clear fault.

Still further, the control module is programmable, for example, to include supplemental illumination activity when the trailer is not being towed, such as for variously flashing and continuous ON lighting sequences and arrangements for testing, safety, and demonstration of the towed vehicle. This can also be accomplished by the addition of a variety of illuminating devices attached to the towed vehicle, beyond the four types of smart lights illustrated in the drawings. Also, the control module can be, for example, selectively operated by a physical switch plate/board mounted within or on the exterior of the towed vehicle, or via an RF signal to a remote handheld device, since as through an iPhone app.

Additional preferred specifications for embodiments of the present invention shown in these drawings include:
input voltage of +13.5 VDC nominal, with 9.0 VDC minimal and 16.0 VDC maximum,
polarity protection, in that the control module is arranged to provide no function and suffer no damages when chassis positive and negative lead are reversed,
fusing is a minimum 15 Amp ATC/ATO automotive style fuse,
output current rating is 2 Amp nominal×four (for LS, RS, LR, RR),
control current limit level is 3 Amps at 13.5 VDC,
control current time limit is 1 second,
short circuit current limit is 3.8 Amps minimum, 5.0 Amps typical, 7.5 Amps maximum per output, and
over temperature current limit is ~2.0 Amps.

Also, the following are preferred arrangements for the embodiment of FIG. 1:

1. Outputs #6 and #7 of module 17 should pass the tail/mark signal (not the stop/turn signal) if the control module fails or if input #1 to the control module is unpowered.

2. Outputs #6 and #7 should not pass the brake light signal (constant B+ to inputs #4 or #5).

3. Output #6 produces tail/marker signals when input #3 is receiving tail/marker signals and input #5 is inactive. Output #6 produces left turn (not stop) signals when input #4 is receiving left turn signals (alternating high and low LED states/flashing).

4. Output #7 produces tail/marker signals when input #3 is receiving tail/marker signals and input #5 is inactive. Output #7 produces right turn (not stop) signals when input #5 is receiving right turn signals (alternating high and low illumination state/flashing).

5. Output #8 produces tail/marker signals when input #3 is receiving tail marker signals and input #4 is inactive. Output #8 produces combination left stop/turn signals when input #4 is receiving left stop/turn signals (constant B+ or alternating high and low state/flashing).

6. Output #9 produces tail/marker signals when input #3 is receiving tail marker signals and input #5 is inactive. Output #9 produces combination right stop/turn signals when input #5 is receiving right stop/turn signals (constant B+ or alternating high and low state/flashing).

7. Lights labeled #3 (tail/marker), #4 (left stop/turn), and #5 (right stop/turn) are powered directly from the 7-way trailer cord leading from the towing vehicle.

8. Smart lights should not momentarily flicker or go out after release of the towing vehicle brake pedal (when, for example, constant B+ or alternating high and low states are removed from stop/turn inputs #4 or #5).

9. Input #1 will be constantly powered by the trailer battery, tow vehicle charge line, RV 12 volt power converter, or a combination thereof or like power sources, and the control module will go into a low power consumption or sleep mode after five minutes (or such other designated time) if there are no significant inputs to #3, #4, and/or #5 lights.

10. All input and output connections should be 14 gauge TEW wire with six inch pigtails.

Figure 2:
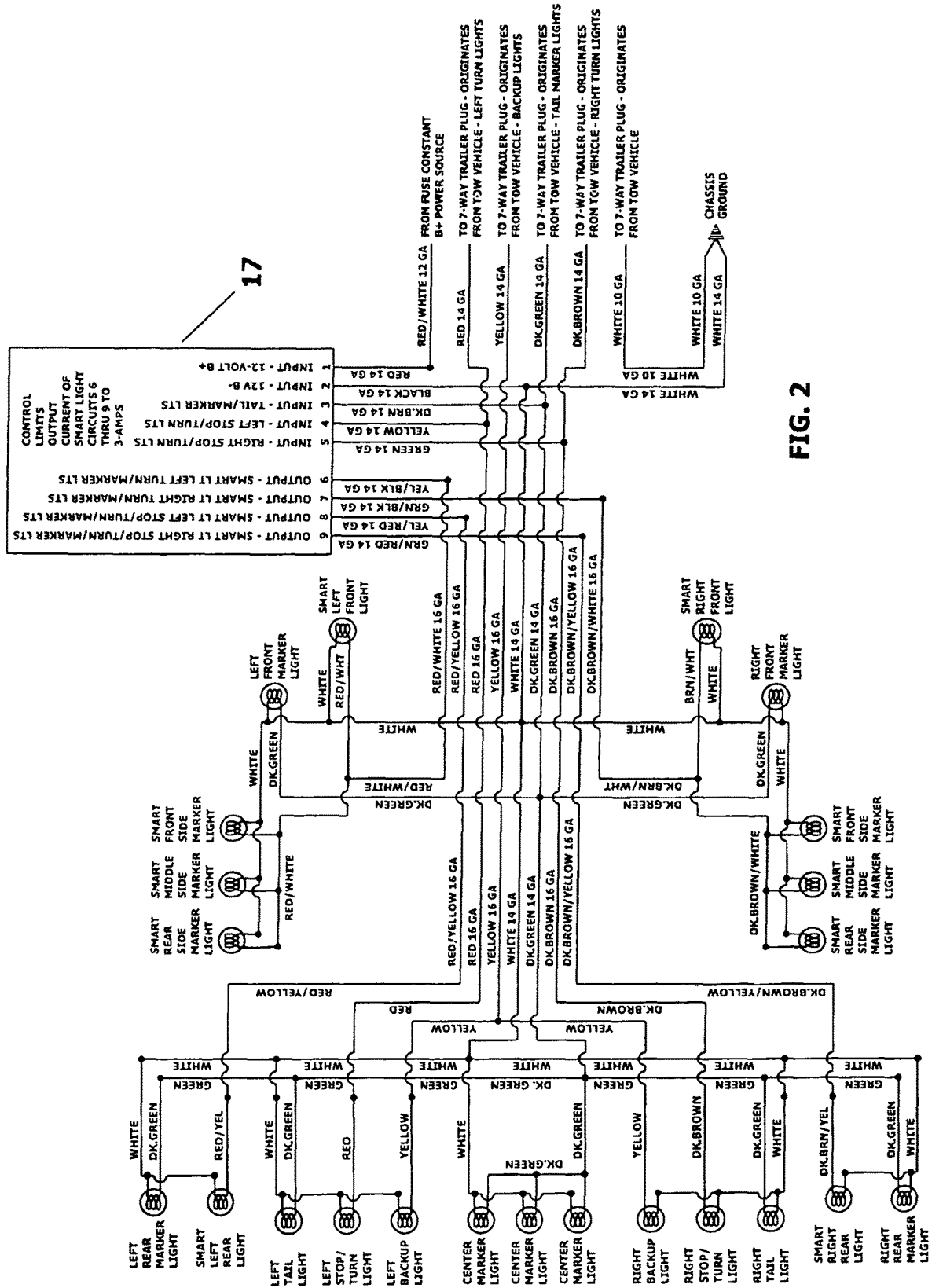
FIG. 2 shows a schematic view of circuitry for an exterior lighting system according to the embodiment of FIG. 1.
Figure 3:
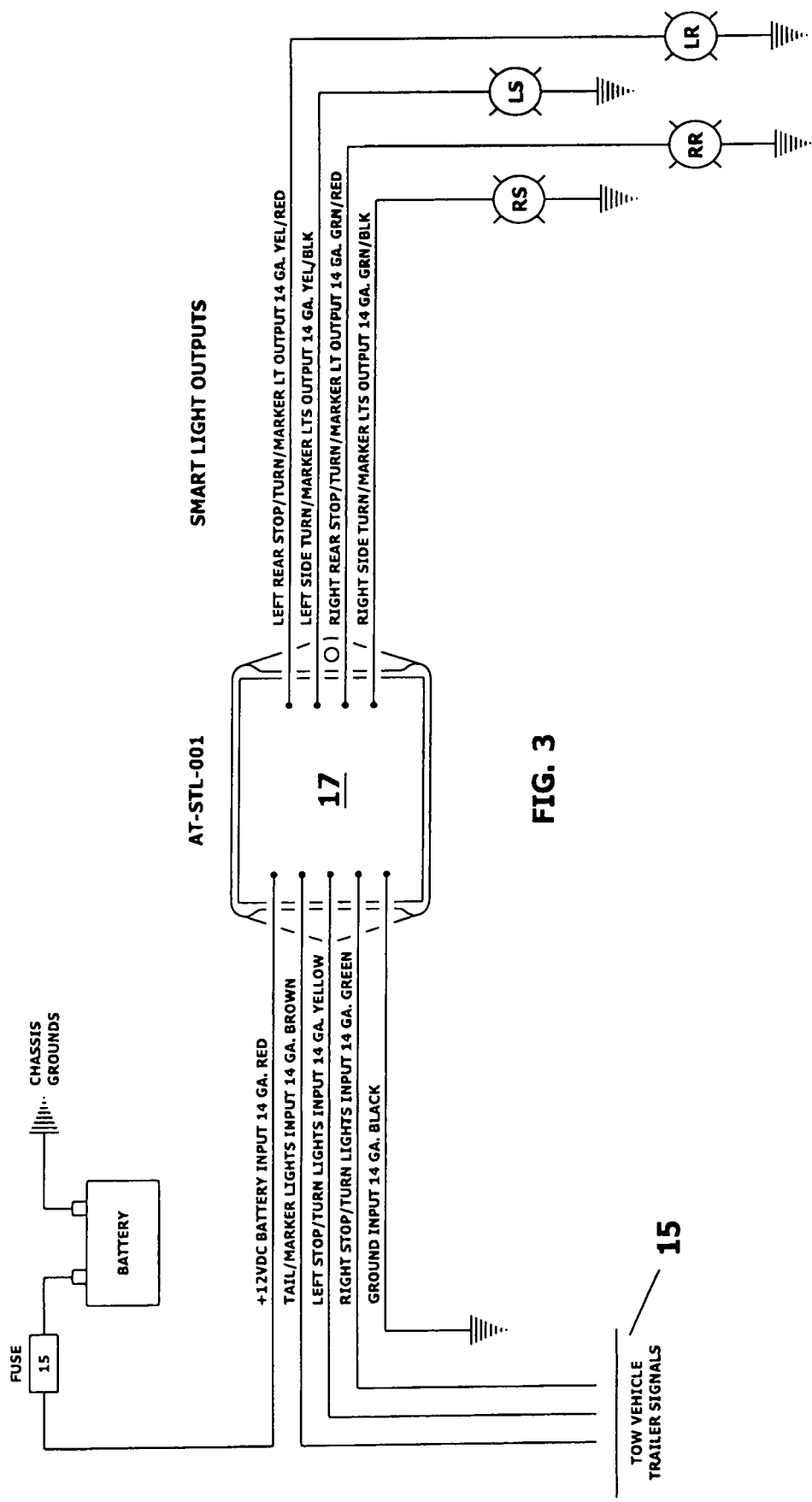
FIG. 3 shows a partial schematic view of circuitry for supplemental illumination in the exterior lighting system of FIG. 1.

Similarly, the following are preferred arrangements for the embodiment of FIG. 2, where in the backup light circuitry is illustrated more fully:

1. The wire gauge can always be larger in given applications, but should not be smaller than the gauge indicated in that drawing, and larger wire sizes can be specified to limit voltage drop in given applications.

2. The second color shown on certain wires indicates wire stripe color, but wire differentiation can alternatively be made by colored tape instead of wire stripe.

3. The control module should remain connected to both constant battery power (B+) and ground (B−).

4. The control module should be programed so that in the event of a failure of that module, all lights connected to the smart light circuits will operate as marker lights.

5. The control module should be programed such that if it detects a short to ground or current overload in any of the smart light circuits, it will shut the shorted circuit "off" until the short or overload is eliminated, and then the control module would be powered "off" to reactive the previously shorted or overloaded circuit.

Although the present invention has been shown and described herein with respect to certain preferred embodiments and alternative configurations, those were by way of illustration and example only. Accordingly, the spirit and scope of the present invention is intended to be limited only by the terms of the appended claims.

What is claimed is:

1. An exterior lighting system for towed vehicles, including means for synchronizing the turn, braking, and backup indicators of the towing vehicle with like indicators of the towed vehicle, as well as with additional illumination on the towed vehicle,
   wherein the additional illumination of the towed vehicle includes side markers having a single LED light which flashes by powering down to less than half the normal brightness and then back up to full brightness, without fully turning off, and
   wherein the additional illumination of the towed vehicle includes a control module having a failsafe mode that permits normal operation of the turn, braking, and backup indicators of the towed vehicle in the event that operation of the additional illumination is not operating properly.

2. The exterior lighting system for towed vehicles according to claim 1, wherein the control module includes an LED indicator diagnostic output when fault conditions arise in connection with the additional illumination.

3. The exterior lighting system for towed vehicles according to claim 1, wherein the control module includes an automatic reset in the event of a fault condition in connection with the additional illumination.

4. An exterior lighting system for towed vehicles, including means for synchronizing the turn, braking, and backup indicators of the towing vehicle with like indicators of the towed vehicle, as well as with additional illumination on the towed vehicle,
   wherein the additional illumination of the towed vehicle includes side markers having a single LED light which flashes by powering down to less than half the normal brightness and then back up to full brightness, without fully turning off,
   wherein supplemental illumination is provided on the towed vehicle to further indicate the movement intentions of the towing vehicle, the system comprising at least the following elements mounted in the towed vehicle:
      plug means for receiving electric signals from the towing vehicle to actuate conventional lighting on the towed vehicle,
      an electrical control system, connected to the plug means, for monitoring the electric signals received from the towing vehicle, and supplying control signals to supplemental lighting devices in response to actuation of the conventional lighting, and
      supplemental lighting devices, connected to the control system for providing additional illumination in response to the control signals, synchronized with the actuation of the conventional lighting.

5. The system according to claim 4 wherein the towed vehicles are travel trailers for recreational camping.

6. The system according to claim 4 wherein the electric signals from the towing vehicle are direct current voltages.

7. The system according to claim 4 wherein the conventional lighting on the towed vehicle are selected from the group of brake, turn, back-up, and side marking lighting devices.

8. The system according to claim 4 wherein the supplemental lighting devices are LEDs.

9. The system according to claim 8 wherein the supplemental lighting devices are placed on the sides of the towed vehicle.

10. The system according to claim 9 wherein the supplemental lighting devices are placed at upper and lower locations on the sides of the towed vehicle, elevationally spaced apart to increase visibility.

11. The system according to claim 10 wherein the towed vehicle is a travel trailer and additional supplemental lighting is placed at the upper corners of the rears of the travel trailer.

12. An exterior lighting system for towed vehicles, including means for synchronizing the turn, braking, and backup indicators of the towing vehicle with like indicators of the towed vehicle, as well as with additional illumination on the towed vehicle, wherein the additional illumination of the towed vehicle includes side markers having at least one LED light which flashes by powering down to less than half the normal brightness and then back up to full brightness, without fully turning off, and providing supplemental lighting activity control when the vehicle is not towed, including for selectively flashing and/or continuous ON lighting sequences and arrangements for testing, safety and demonstration of the vehicle.

* * * * *